United States Patent
Tung et al.

(10) Patent No.: US 9,731,806 B2
(45) Date of Patent: Aug. 15, 2017

(54) ANTI-COILING WIRE STRUCTURES AND MOORED BALLOONS WITH THE SAME

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Shih-Hao Tung, New Taipei (TW); Chien-Hung Lee, New Taipei (TW); Feng-Ching Su, New Taipei (TW); Cheng-Yi Lai, New Taipei (TW); Tzu-Hsiu Hung, New Taipei (TW)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 88 days.

(21) Appl. No.: 14/927,475

(22) Filed: Oct. 30, 2015

(65) Prior Publication Data
US 2016/0121991 A1    May 5, 2016

(30) Foreign Application Priority Data
Oct. 31, 2014   (TW) .............................. 103137705 A

(51) Int. Cl.
*B64B 1/50* (2006.01)
(52) U.S. Cl.
CPC ..................................... *B64B 1/50* (2013.01)

(58) Field of Classification Search
CPC .... B64B 1/50; B64B 1/00; B64B 1/66; B64B 1/40; B64B 1/06; B64B 1/02; B64B 2201/00; B64B 1/22
See application file for complete search history.

(56) References Cited

U.S. PATENT DOCUMENTS

| | | | |
|---|---|---|---|
| 586,590 A * | 7/1897 | Brodbeck | B64B 1/50 104/22 |
| 8,544,788 B1 * | 10/2013 | Capper | B64B 1/28 244/30 |
| 2012/0056032 A1 * | 3/2012 | Redford | B64B 1/50 244/33 |

FOREIGN PATENT DOCUMENTS

| | | | |
|---|---|---|---|
| CN | 103612741 | 3/2014 | |
| GB | 1408232 | 10/1975 | |
| WO | WO 2011005851 A2 * | 1/2011 | ............... B64B 1/50 |
| WO | WO 2014200566 A2 * | 12/2014 | ............... B64B 1/50 |

* cited by examiner

*Primary Examiner* — Brian M O'Hara
*Assistant Examiner* — Assres H Woldemaryam
(74) *Attorney, Agent, or Firm* — Steven Reiss

(57) ABSTRACT

A moored balloon includes a balloon, a wire coupled to the balloon, an antenna, a cable coupled to the balloon, a rotating device hung below the balloon, and a fixing device. The rotating device comprises a rotating unit and a bracket. The rotating unit comprises a bearing seat mounted on the bracket, a bearing unit mounted on the bearing seat, and a shaft passing through the bearing unit and coupled to the balloon. The fixing device comprises a receiving tube for receiving the antenna. The receiving tube is located on the bracket. The shaft moves with the balloon to generate a twisting force, the bearing unit counterbalances the twisting force to prevent the cable being twisted with the wires.

9 Claims, 5 Drawing Sheets

ANTI-COILING WIRE STRUCTURES AND MOORED BALLOONS WITH THE SAME

FIELD

The subject matter herein generally relates anti-coiling wire structures and moored balloons with the same.

BACKGROUND

Generally, a moored balloon comprises a balloon, a wire, a cable, and a rotating device located on the ground. One end of the cable is connected to the balloon, the other end of the cable is tied to the rotating device. When the balloon is in the sky, the balloon is blown by the wind that causes the balloon changing the orientation with the wind. The rotating device can rotate with the wind to prevent the wire and the cable being twisted.

BRIEF DESCRIPTION OF THE DRAWINGS

Implementations of the present technology will now be described, by way of example only, with reference to the attached figures, wherein.

DETAILED DESCRIPTION

Figure 1:
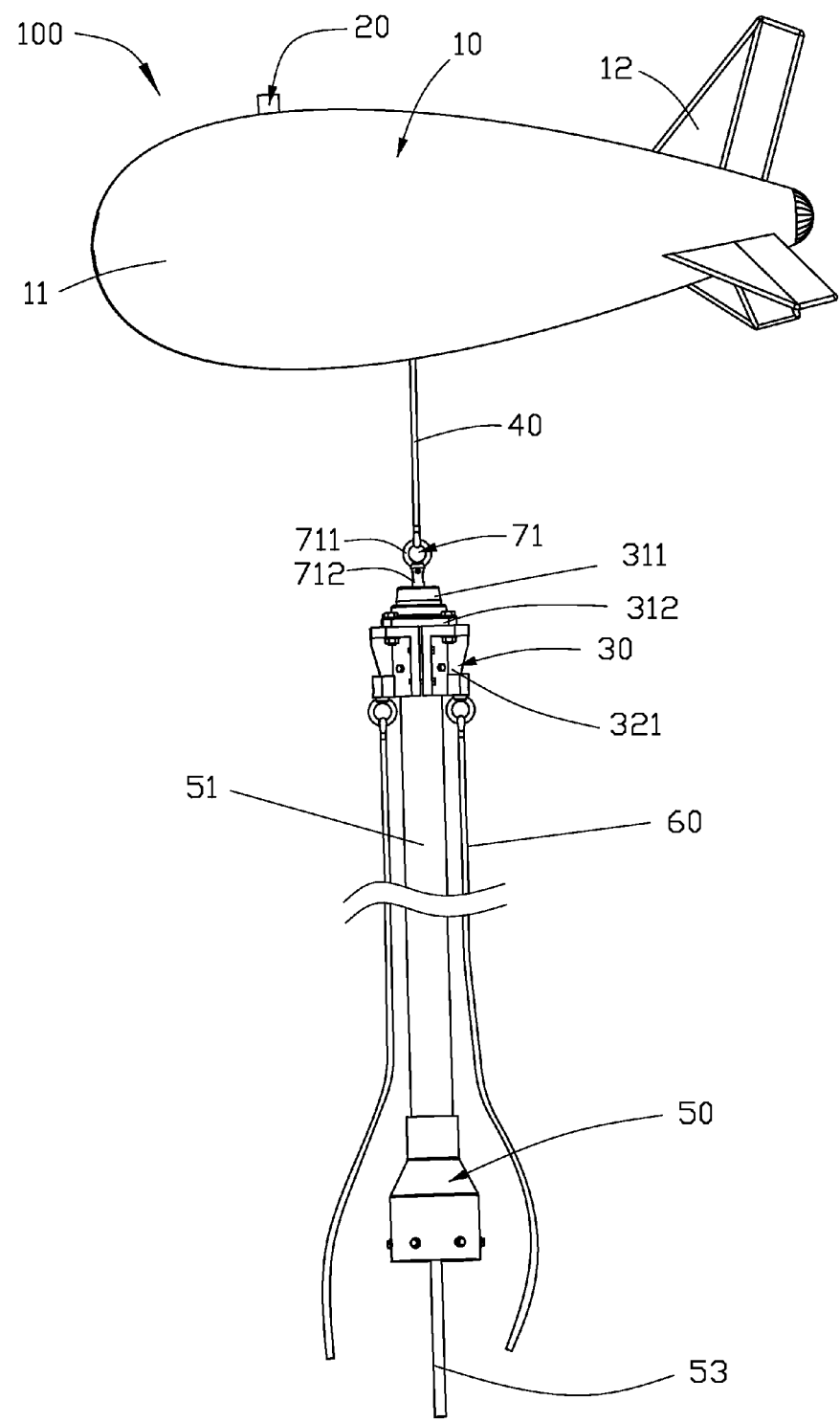
FIG. 1 is a schematic perspective view of a moored balloon with anti-coiling wire structure, the moored balloon includes a rotating device.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

The present disclosure is described in relation to anti-coiling wire structures and moored balloons with the same.

Figure 2:
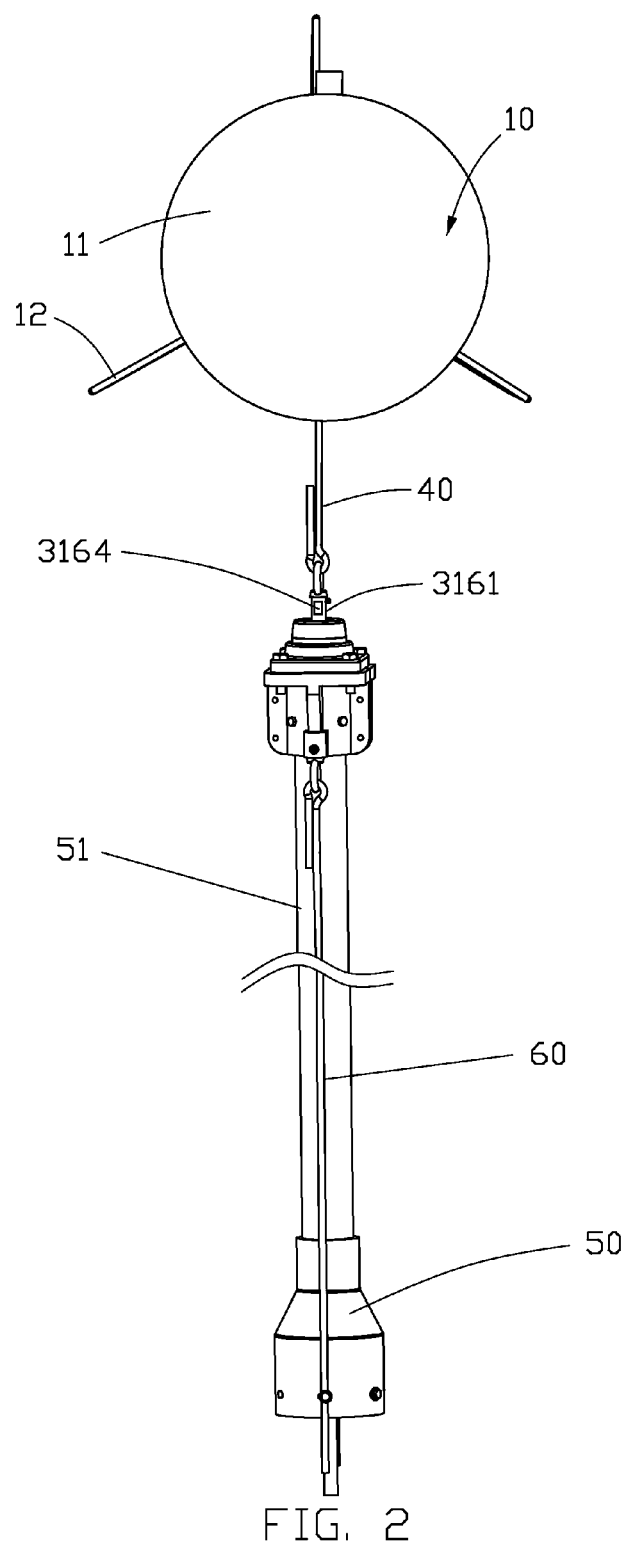
FIG. 2 is a schematic perspective view of the moored balloon with anti-coiling wire structure viewed from another angle.

FIGS. 1-2 illustrate that the moored balloon 100 can be applied to emergency situation. The moored balloon 100 includes a balloon 10, a rotating device 30, a fixing device 50, an antenna 52, a cable 53, and a wire 60. The rotating device 30 is hung below the balloon 10. The fixing device 50 is positioned on the rotating device 30. The antenna 52 is received in the fixing device 50. One end of the cable 53 is coupled to the antenna 52, the other end of the cable 53 is fixed on a hoister (not shown) located on the ground. One end of the wire 60 is tied to the rotating device 30, the other end of the wire 60 is fixed on a winch (not shown) located on the ground. In the exemplary embodiment, the balloon 10 communicates with a base station (not shown) located on the ground. The base station transforms a signal to the cable 53, the cable 53 transforms the signal and transmits to the antenna 52, and the antenna 52 emits the signal to make the communications relay.

The balloon 100 includes a body 11, and a spoiler 12 located on an end of the body 11. In the exemplary embodiment, the body 11 can reduce the effect of wind and improve stability of the balloon 10. In other embodiments, the body 11 can be cylindrically shaped. An anemograph 20 is mounted on a top of the balloon 10, which records variable buoyant force and wind force of the balloon 10 and transmit data of the buoyant force and the wind force to the base station. A tether 40 is tied to a bottom of the balloon 10. A first eyebolt 71 is coupled to the tether 40 to hang the rotating device 30 below the balloon 10.

Figure 3:
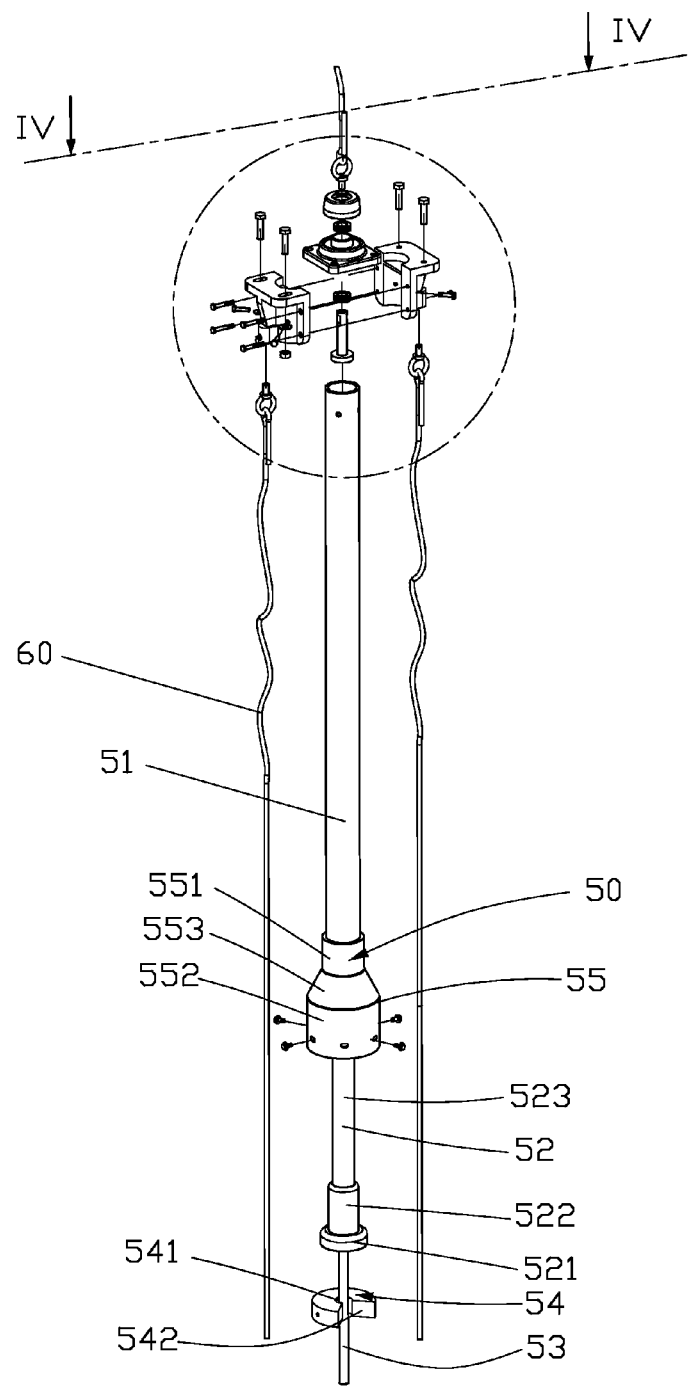
FIG. 3 is an exploded view of FIG. 1.
Figure 4:
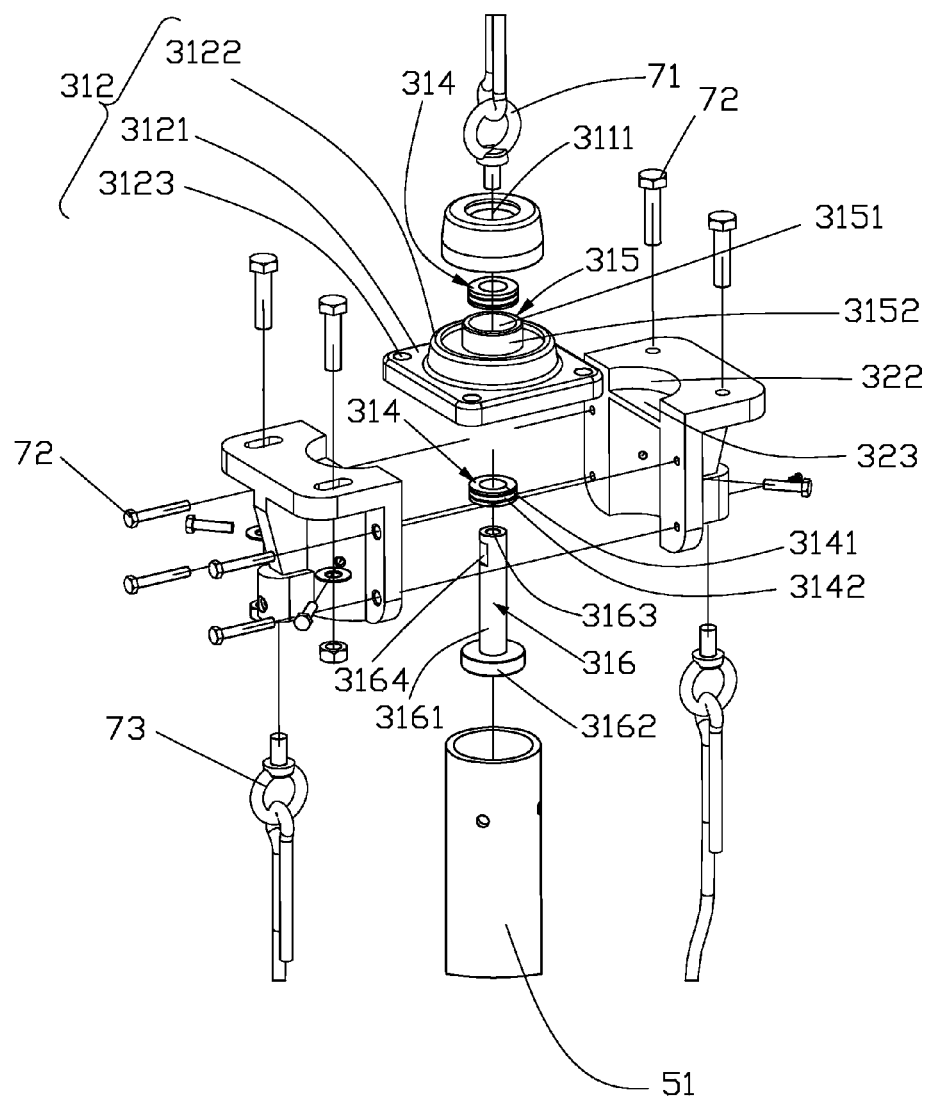
FIG. 4 is an enlarged view of the rotating device of FIG. 3.
Figure 5:
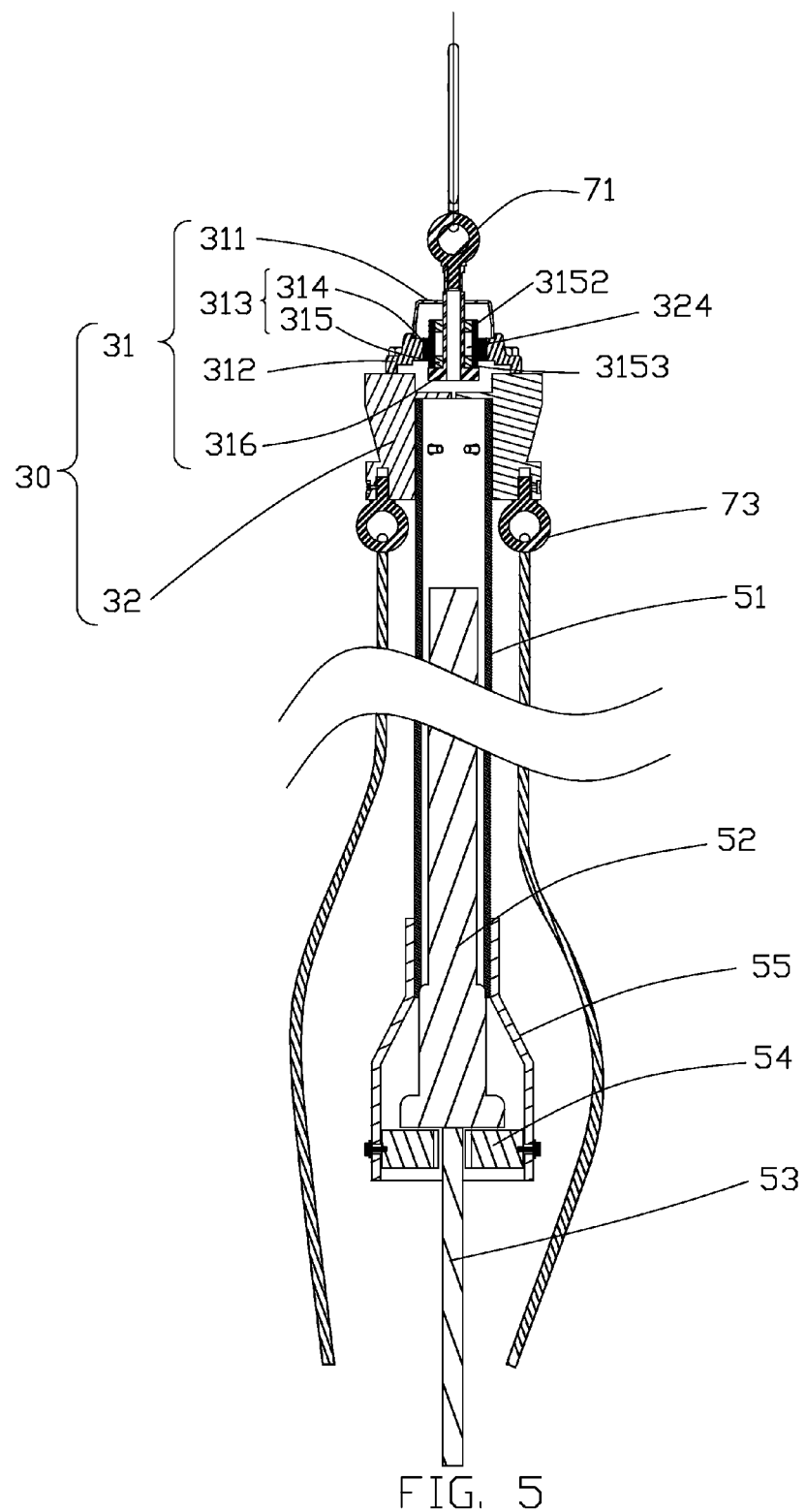
FIG. 5 is a partial cross-sectional view taken along IV-IV of FIG. 3.

FIGS. 3-5 illustrate that the rotating device 30 includes a rotating unit 31, and a bracket 32 supporting the rotating unit 31.

The rotating unit 31 includes a first cover 311, a bearing seat 312 latched with the first cover 311, a bearing unit 313 received in the bearing seat 312, and a shaft 316 passing through the bearing unit 313.

The first cover 311 is cylindrically shaped, which defines a first receiving hole 311.

The bearing seat 312 includes a base 3121, and a stage 3122 upwardly extending from the base 3121. The base 3121 is rectangle shaped, and the stage 3122 is cylindrically shaped. Four positioning holes 3123 are defined on four corners of the base 3121. Screws 72 engage with the positioning holes 3123 to position the bearing seat 312 on the bracket 32.

The bearing unit 313 includes a pair of first bearings 314 and a second bearing 315. Each first bearing 314 includes an inner wall 3141, an external wall 3142 opposite to the inner wall 3141, and a ball bearing (not shown) located between the inner wall 3141 and the external wall 3142. In the exemplary embodiment, the first bearing 314 is thrust bearing. The second bearing 315 defines a second receiving hole 3151. The second bearing 315 includes a top portion 3152, and a bottom portion 3153 opposite to the top portion 3152. The second bearing 315 is received in the stage 3122. An axis of the second bearing 315 is coincident with an axis of the stage 3122. The top portion 3152 is located on the stage 3122 and faces to the first cover 311. The bottom portion 3153 is located on the stage 3122 away from the first cover 311. One of the first bearings 314 is received in the top portion 3152 of the second bearing 315, and the other one of the first bearings 314 is received in the bottom portion 3153 of the second bearing 315.

The shaft 316 includes a rod 3161, and a positioning end 3162 located on the rod 3161. The rod 3161 is cylindrically shaped. An end of the rod 3161 spaced from the positioning end 3162 sequentially passes through one of the first bearings 314, the bearing seat 312, the second bearing 315, the other one of the first bearing 314, and the first cover 311. The rod 3161 is fixed to the eyebolt 72 to mount the rotating unit 31 on the balloon 10. A diameter of the positioning end 3162 is greater than that of the rod 3161. A screw hole 3163 is defined on the end of the rod 3161 away from the positioning end 3162. The eyebolt 72 is inserted into the screw hole 3163 and coupled to the shaft 316. The rod 3161 defines a notch 3164 convenient for assembling the shaft 316 and the first eyebolt 71. When the balloon 10 changes orientation by the wind force, the body 11 causes the shaft 316 to be rotated, the inner wall 3141 of the first bearing 314 is rotated with the shaft 316, and the external wall 3142 of the first bearing 314 is relatively static to keep the bearing seat 312 in original state.

The bracket 32 is mounted on the base 3121 by screws 72. Since the bearing bracket 312 cannot be rotated with the change in orientation of the balloon 10, the bracket 32 remains in its original orientation. The bracket 32 includes a pair of main body 321. Each main body 321 defines a half-circular shaped groove 322. A baffle 323 extends from an inner surface of the bracket 32 surrounding the groove 322 to an axis of the groove 322. The baffle 323 is a half-circular shaped board. The pair of the main bodies 321 are secured together by screws 72. When the main bodies 321 are secured with each other, the grooves 322 form a cylindrically shaped through hole 324. A pair of second eyebolts 73 are secured on the pair of main bodies 3211 respectively. The second eye bolt 73 is located on a bottom portion of the main body 3211.

The fixing device 50 includes a receiving tube 51 receiving the antenna 52, a supporting block 54 supporting the antenna 52, and a second cover 55 positioned on the supporting block 54. The antenna 52 transmits $2^{nd}$ Generation (2G) or $3^{rd}$ Generation (3G) signals directly to remote stations without the need for a local base station. The antenna 52 includes a bottom portion 521, a connecting portion 522 perpendicularly upwardly extending from the bottom portion 521, and an antenna portion 523 perpendicularly upwardly extending from the connecting portion 522. A diameter of the bottom portion 521 is greater than a diameter of the connecting portion 522, and the diameter of the connecting portion 522 is greater than a diameter of the antenna portion 523.

The receiving tube 51 is partial received in the receiving hole 324 of the bracket 32. The top of the receiving tube 51 is contacted with the baffle 323. The receiving tube 51 is secured on the bracket 32 by screws 72. The antenna portion 523 is received in the receiving tube 51.

The second cover 55 is a hollow case. The second cover 55 includes a first part 551, a second part 552, and a third part 553 located between the first part 551 and the second part 552. The first part 551 and the second part 552 are cylindrically shaped, and the third part 553 is conical shaped. The first part 551 is secured on an end of the receiving tube 51 away from the bracket 32. The connecting portion 522 and bottom portion 521 of the antenna 52 are received in the second part 552 and the third part 553. In the exemplary embodiment, the first part 551 is pasted with the receiving tube 51 by glue.

The supporting block 54 is received in the bottom of the second cover 55 and secured with the second cover 55 by screws 72. In the exemplary embodiment, structure of the second cover 55 is adapted to the antenna 52, that is, the second cover 55 is a cylindrical shell in diameter gradually greater from top to bottom.

The supporting block 54 is a hollow cylinder. The supporting block 54 defines a through hole 541 and a gap 542 communicating with the through hole 541.

The cable 53 is passed through the supporting block 54 and out of the second cover 55. One end of the cable 53 is coupled to the hoister, the other end of the cable 53 is coupled to the bottom portion 521 of the antenna 52. The cable 53 can transmit signals sent from the base station to the antenna 52, which achieves conversion and transmission of communication signal.

One end of the wire 60 is tied to the second eyebolt 73 mounted on the bracket 32, the other end of the wire 60 is fixed on the winch located on the ground. The wire 60 is reeled off or reeled up to control height of the balloon 10. In the exemplary embodiment, the number of the first eyebolt 71 is one and the number of the second eyebolt 73 is two, the first eyebolt 71 and each second eyebolt 73 includes a first ring ending 711 and second ring ending 731 and a first screw ending 712 and second screw ending 732 protruding from the first ring ending 711 and the second ring ending 731. The first ring ending 711 is coupled to the tether 40, and the first screw ending 712 is screwed with the shaft 316. The second ring ending 731 is tied to the wire 60, and the second screw ending 732 is mounted on the main body 321 of the bracket 32.

The cable 53 is coupled to the antenna 52 received in the receiving tube 51. The receiving tube 51 is mounted on the bracket 32 to mount the cable 53 on the bracket 32. The wires 60 are fixed on the main bodies 321 of the bracket 32 by the second eyebolts 73. When the balloon 10's orientation is changed by under the wind force, the bracket 32 remains in its original configuration, and the cable 53 and the wires 60 also remain in their original configuration to prevent the cable 53 from twisting with the wires 60.

In summary, the moored balloon 100 of the disclosure that the rotating device 30 is hung below the balloon 10. When the rotating device 30 is floated with the balloon 10, the bearing unit 313 makes the bracket 32 not rotate with the rotation of the balloon 10, and the wire 60 fixed on the bracket 32 and the cable 53 coupled to the receiving tube 52 do not rotate either, which prevents the cable 53 twisting with the wires 60.

The exemplary embodiments shown and described above are only examples. Many details are often found in the art such as the other features of an anti-coiling wire structures and moored balloons with the same. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:
1. A moored balloon, comprising:
a balloon:
a wire coupled to the balloon;
an antenna;
a cable coupled to the balloon;
a rotating device hung below the balloon, the rotating device comprising a rotating unit and a bracket, the rotating unit comprising a bearing seat mounted on the bracket, a bearing unit mounted on the bearing seat, and a shaft passing through the bearing unit and coupled to the balloon;

a fixing device comprising a receiving tube for receiving the antenna, the receiving tube located on the bracket;

wherein when the shaft moves with the balloon to generate a twisting force, the bearing unit counterbalances the twisting force to prevent the cable from twisting with the wire.

2. The moored balloon of claim 1, wherein the bearing unit comprises a pair of first bearings, the pair of first bearings are sleeved on the shaft and located in the bearing seat.

3. The moored balloon of claim 2, wherein the pair of first bearings are thrust bearings.

4. The moored balloon of claim 2, wherein the bearing unit further comprises a second bearing, the second bearing comprises a top portion located on the bearing seat and near the balloon, and a bottom portion located on the bearing seat and away from the balloon.

5. The moored balloon of claim 4, wherein one of the first bearings is mounted on the top portion of the second bearing, and the other one of the first bearing is mounted on the bottom portion of the second bearing.

6. The moored balloon of claim 4, wherein the rotating unit further comprises a first cover latched with the bearing seat, the shaft sequentially passes through one of the first bearing, the bearing seat, the second bearing, the other one of the first bearing, and the first cover to be coupled to the balloon by a tether.

7. The moored balloon of claim 1, wherein the bracket comprises a receiving hole and a baffle received in the receiving hole, and the receiving tube is received in the receiving hole and located on a side of the baffle away from the bearing seat.

8. The moored balloon of claim 7, wherein the fixing device comprises a supporting block and a second cover, the supporting block is received in the second cover for supporting the antenna, and the an end of the receiving tube away from the baffle is received and fixed to the second cover.

9. The moored balloon of claim 1, wherein the antenna is moved with the movement of the balloon, the cable transmits a communication signal to the antenna, and the antenna transmits the communication signal.

\* \* \* \* \*